(12) United States Patent
Erwin et al.

(10) Patent No.: US 6,396,530 B1
(45) Date of Patent: May 28, 2002

(54) METHOD FOR IMPROVING EXPOSURE RESOLUTION USING MULTIPLE EXPOSURES

(75) Inventors: James C. Erwin, Rochester; William G. Miller, Williamson, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/592,097

(22) Filed: Jun. 12, 2000

(51) Int. Cl.$^7$ .................................................. B41J 2/47
(52) U.S. Cl. ....................................... 347/240; 347/251
(58) Field of Search ................................ 347/239, 240, 347/241, 251, 255, 256; 382/167, 164, 260, 299; 349/2, 5

(56) References Cited

U.S. PATENT DOCUMENTS

| | | | |
|---|---|---|---|
| 4,728,965 A | 3/1988 | Kessler et al. ............... 347/241 |
| 5,061,049 A | 10/1991 | Hornbeck .................... 359/224 |
| 5,325,137 A | 6/1994 | Konno et al. .................. 353/63 |
| 5,461,410 A | 10/1995 | Venkateswar et al. ....... 347/240 |
| 5,517,340 A | * 5/1996 | Doany et al. ................... 349/5 |
| 5,521,748 A | 5/1996 | Sarraf ......................... 359/321 |
| 5,652,661 A | 7/1997 | Gallipeau et al. ............ 358/302 |
| 5,701,185 A | 12/1997 | Reiss et al. .................. 358/471 |
| 5,721,622 A | 2/1998 | Venkateswar ............... 358/298 |
| 5,743,612 A | 4/1998 | Matsuda et al. ............... 353/97 |
| 5,754,217 A | 5/1998 | Allen ........................... 347/239 |
| 5,754,305 A | 5/1998 | DeClerck et al. ............ 358/302 |
| 5,805,274 A | 9/1998 | Saita ............................. 355/38 |
| 6,195,456 B1 | * 2/2001 | Balasubramanian et al. ..... 382/167 |

* cited by examiner

*Primary Examiner*—Hai Pham
(74) *Attorney, Agent, or Firm*—Nelson Adrian Blish

(57) ABSTRACT

A method for improving exposure resolution that includes several steps. A high gray scale resolution image is analyzed and a determination is made of a media plane (331) exposure gray scale resolution requirement. Exposure time and an exposure intensity is determined for each of the low gray scale resolution intermediate images. A number of low gray scale resolution intermediate images (332) are required to provide the media plane exposure resolution; and an exposure time and exposure intensity (333) for each of the low resolution intermediate images is determined. An image content for each of the low gray scale resolution intermediate images is determined (334) and each of the low resolution intermediate images is printed (335) at the exposure time and the exposure intensity.

4 Claims, 9 Drawing Sheets

METHOD FOR IMPROVING EXPOSURE RESOLUTION USING MULTIPLE EXPOSURES

FIELD OF THE INVENTION

This invention relates in general to an apparatus and method for spatially and temporally modulating a light beam and imaging the modulated light onto a photosensitive media.

BACKGROUND OF THE INVENTION

Photographic images are traditionally printed onto photographic paper using conventional film based optical printer. The photographic industry, however, is converting to digital imaging. One step in the digital imaging process uses images obtained from digital cameras, or scanning film exposed in traditional photographic cameras to create digital image files that are then printed onto photographic paper.

The growth of the digital printing industry has led to multiple approaches to digital printing. One of the first methods of digital printing was the use of cathode ray tube (CRT) based printers. While such printers provide a means for digital printing, the technology has several limitations, for example reduced resolution as determined by the limitation of the phosphor and electron beam, high cost, and ability to provide sufficient red exposure to the media when operating at frame rates above 10,000 prints per hour. Another commonly used approach to digital printing is the laser engine shown in U.S. Pat. No. 4,728,965, which is a polygon, flying spot system using red, green, and blue lasers. Unfortunately, as with CRT printers, laser based systems tend to be expensive.

More contemporary approaches use a single spatial light modulator such as the Texas Instruments digital micromirror device (DMD), shown in U.S. Pat. No. 5,061,049, or a liquid crystal device (LCD) modulator to modulate an incoming optical beam. Spatial light modulators provide both significant advantages in cost, allow longer exposure times, and have been proposed for a variety of different printing systems from line printing systems such as the printer depicted in U.S. Pat. No. 5,521,748, to area printing systems such as the system described in U.S. Pat. No. 5,652,661. However, DMD technology is not widely available, is expensive, and is not easily scaleable to higher resolution.

Liquid crystal modulators are a low cost solution for applications involving spatial light modulators. Several photographic printers using commonly available LCD technology have been proposed. Examples of such systems are described in U.S. Pat. Nos. 5,652,661 and 5,701,185. Until recently, most spatial light modulators have been designed for use in transmission. While such a method offers several advantages in ease of optical design for printing, there are several drawbacks to the use of conventional transmissive LCD technology. Transmissive spatial light modulators generally have reduced aperture ratios and the use of thin film transistor (TFT) on glass technology does not promote the pixel to pixel uniformity desired in many printing applications. Furthermore, in order to provide a large number of pixels, many high resolution transmissive LCDs possess footprints of several inches. Such a large footprint can be unwielding when combined with a print lens. As a result, most LCD printers using transmissive technology are constrained to either low resolution or small print sizes. To print high resolution 8 inch by 10 inch images with at least 300 pixels per inch requires 2400 by 3000 pixels. Spatial light modulators with such resolutions are not readily available.

Furthermore, each pixel must have a gray scale depth so as to be able to render a continuous tone print and do so uniformly over the frame size.

The recent advent of high resolution reflective LCDs with high contrast, greater than 100:1, described in U.S. Pat. Nos. 5,325,137 and 5,805,274, has opened possibilities for printing that were previously unavailable. Specifically, these references show a printer which is based on a reflective LCD spatial light modulator illuminated sequentially by red, green and blue, light emitting diodes (LEDs), and wherein the LCD spatial light modulator may be sub-apertured and dithered in two or three directions to increase the resolution. This method has been applied to transmissive LCD systems due to the already lower fill factor. Incorporating dithering into a reflective LCD printing system would allow high resolution printing while maintaining a small footprint. Also, because of the naturally high fill factor present in many reflective LCD technologies, the dithering can be omitted with no detriment to the continuity of the printed image. While devices such as the TI micromirror can incorporate a secondary mask as shown in U.S. Pat. No. 5,754,217, the mask may be displaced from the device or at the very least add to the processing complexity of an already complex device. The use of a single LCD serves to significantly reduce the cost of the printing system. Furthermore, the use of an area spatial light modulator sets the exposure times at sufficient length to avoid or significantly reduce reciprocity failure.

The progress in the reflective LCD device field made in response to needs of the projection display industry have provided opportunities in printing applications. One aspect of the design is that a LCD designed for projection display can be incorporated into the printing design with little or no modification to the LCD itself. By designing an exposure system and data path such that an existing projection display device requires little or no modification allows inexpensive incorporation of a commodity item into a print engine.

Of the reflective LCD technologies, the most suitable to this design, though not the only reflective LCD, is one which incorporates a small footprint with an integrated CMOS backplane. The compact size along with the uniformity of drive offered by such a device will translate into better image quality than other LCD technologies. There has been progress in the projection display industry towards incorporating a single reflective LCD, primarily because of the lower cost and weight of single device systems. See U.S. Pat. No. 5,743,612. Of the LCD technologies, the reflective LCD with the silicon backplane can best achieve the high speeds required for color sequential operation. While this increased speed may not be as essential to printing as it is for projection display, the higher speeds can be utilized to incorporate additional gray scale and uniformity correction to printing systems.

Current reflective LCD technology, however, does not provide adequate bit depth. Gray scale is a function of bit depth. Spatial light modulator printing systems can incorporate a variety of methods to achieve gray scale. Texas Instruments employs a time delayed integration (TDI) system that works well with line arrays as shown in U.S. Pat. Nos. 5,721,622 and 5,461,410. While this method can provide adequate gray levels at a reasonable speed, line printing TDI methods can result in registration problems and soft images. Alternate methods have been proposed, particularly around transmissive LCDs such as the design presented in U.S. Pat. No. 5,754,305, which can also be incorporated into reflective LCDs.

However, if the LCD is sufficiently fast, the proposed printer can create gray scale in area images adequately without time delayed integration or analog operation. It is the primary purpose of this invention to present such a solution.

SUMMARY OF THE INVENTION

An object of this invention is to provide for a high pixel density color image at an imaging plane. Another object of the present invention is to provide a high pixel density at a media exposure plane in an AgX printing systems. Yet another object of the present invention is to provide means to utilize a high site density spatial light modulator to create digital images for imaging onto photographic media.

Briefly, according to one aspect of the present invention, a method for improving exposure resolution that comprises several steps. A gray scale content of a high resolution image is analyzed and a determination is made of a media plane exposure resolution requirement. Exposure time and an exposure intensity is determined for each of the low resolution intermediate images. A number of low resolution intermediate images are required to provide the media plane exposure resolution; and an exposure time and exposure intensity for each of the low resolution intermediate images is determined. An image content for each of the low resolution intermediate images is determined and each of the low resolution intermediate images is printed at the exposure time and the exposure intensity.

According to one embodiment of the present invention light emitting diode sources are imaged color sequentially through a polarizer, spatial uniformizing optics, and a polarizing beamsplitter to create essentially telecentric illumination at the plane of a spatial light modulator.

A benefit of the present invention is that an 8 bit or lower resolution LCD, transmissive or reflective, used in a print engine, will result in acceptable contouring of the final output prints by providing an increase in the exposure resolution. This invention accomplishes this by using multiple exposures at exposure levels suitable for printing onto photographic paper.

The invention and its objects and advantages will become more apparent in the detailed description of the preferred embodiment presented below.

DETAILED DESCRIPTION OF THE INVENTION

The present description will be directed in particular to elements forming part, or in cooperation more directly with an apparatus in accordance with the present invention. It is understood that the elements not shown specifically or described may take various forms well know to those skilled in the art.

Figure 1A:
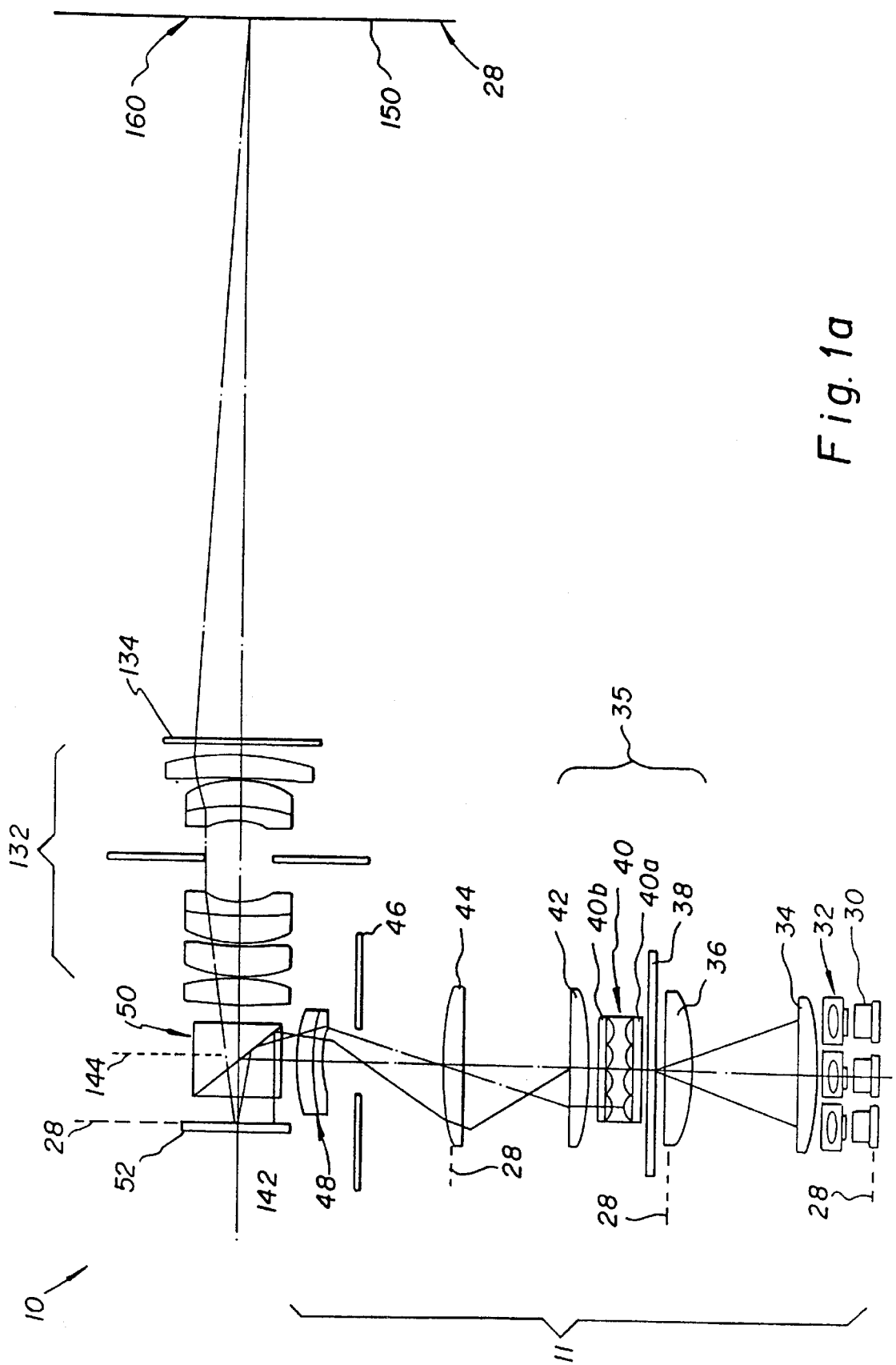
FIG. 1a illustrates a layout of a reflective spatial light modulator based printing system for printing two-dimensional swaths using light emitting diodes.

Referring now to the drawings, wherein like reference numerals represent identical or corresponding parts throughout the several views, FIG. 1a illustrates a photographic printer referred to in general by numeral 10.

Photographic printer 10 is comprised of a light source 30 which can be in the form of light emitting diodes (LED); illumination optics 11; a polarization beamsplitter element 50 which can be in the form of a beamsplitting cube; a reflective spatial light modulator 52 in the form of a reflective liquid crystal device (LCD) modulator; a data path (not shown) for providing image information to spatial light modulator 52; and a print lens assembly 132. Photographic printer 10 provides a two dimensional image or swaths of area light sensitive media 160 located at an image plane 150.

Figure 2:
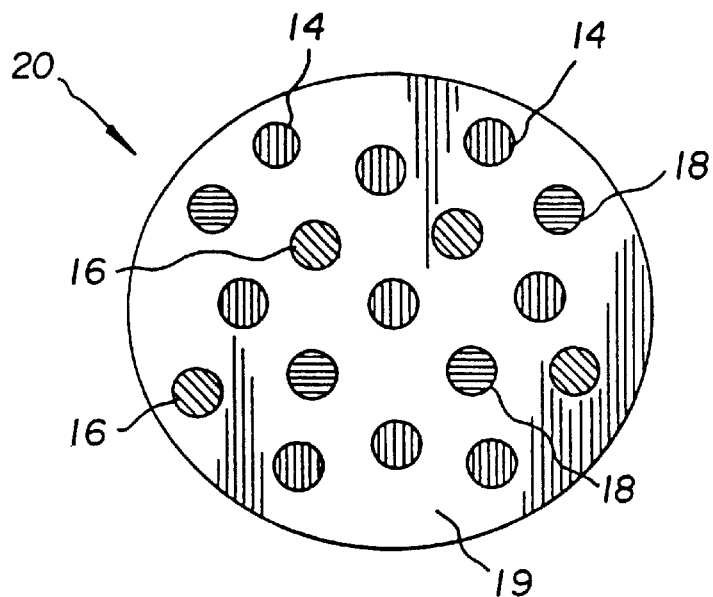
FIG. 2 illustrates a two-dimensional arrangement of light emitting diodes.

Light source 30 comprises a two-dimensional array of LEDs at three distinct wavelengths representing red, blue, and green emissions. One arrangement of LEDs of light source 30 are contained in a circular aperture 20 as shown in FIG. 2. LEDs emitting in the red wavelength 14, LEDs emitting in the blue wavelength 18, and LEDs emitting in the green wavelength 16, are placed in a frame 19. The LEDs are arranged such that the colors of emission are spread evenly about the aperture. The relative number of LEDs emitting at a given wavelength are determined by the sensitivity of the media onto which the light is imaged. An example arrangement could include four red LEDs 14, two green LEDs 16, and two blue LEDs 18. The LEDs are spaced such that a significant fraction of the light emitted can be captured in the collection aperture of the downstream optics of illumination optics 11. Furthermore, redundancy in emitters reduces the system sensitivity to malfunction in any individual LED. The LEDs of light source 30 are operated in a pulsed and color sequential manner. For any given image, groups of LEDs are activated in order of wavelength. For example, the red LEDs 14 are activated and deactivated, blue LEDs 18 are activated and deactivated, then green LEDs 16 are activated and deactivated. Any activation cycle for a given wavelength consists of a series of pulses, which may vary in duration or amplitude. The length and duration of the pulses are determined by the level of illumination needed per image to define the gray scale and by the sensitivity of media 160 to light level and illumination time.

Figure 3:
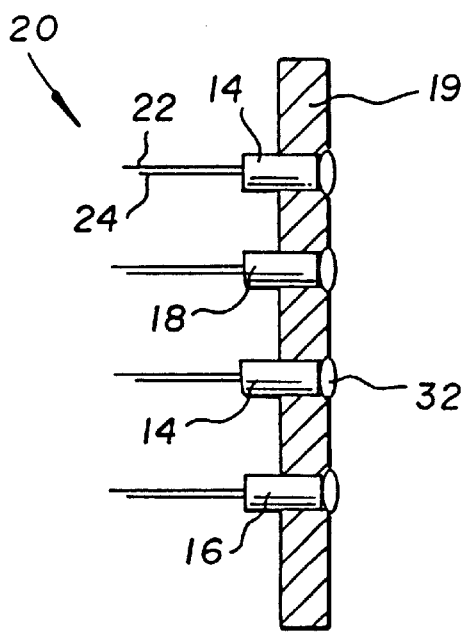
FIG. 3 shows a cross-section of an apparatus for holding light emitting diodes and collimating lenses for light emitting diodes.
Figure 4:
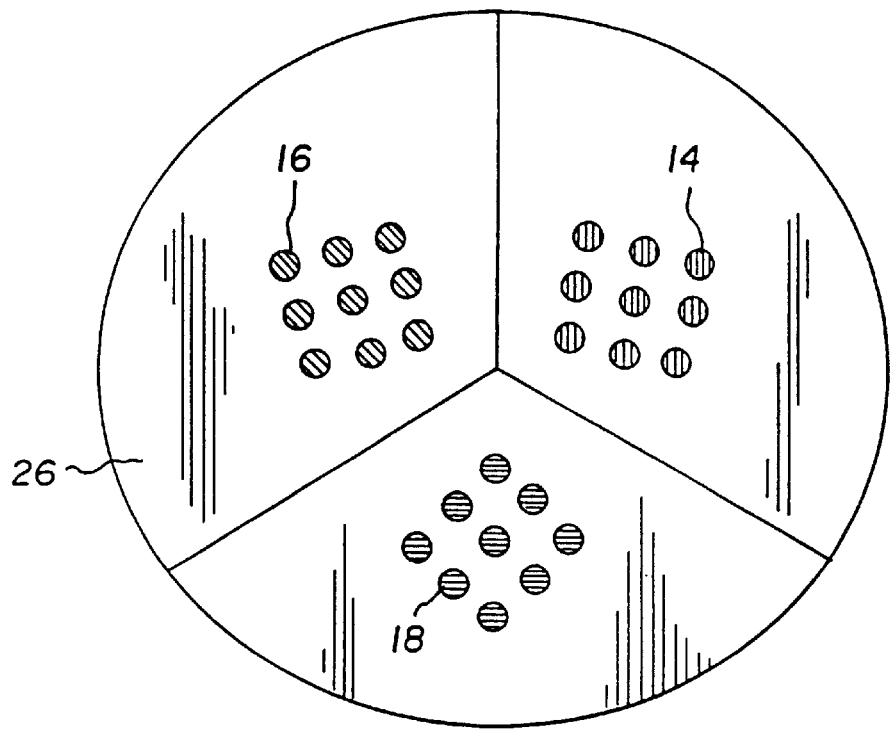
FIG. 4 shows a rotating wheel of light emitting diodes for color sequential illumination.

Each of the LED emitters from light source 30 is mapped by illumination optics 11 to cover the area of LCD modulator 52. Illumination optics 11 are designed to provide uniform and essentially telecentric illumination at the modulator plane. This design is unique to printing applications because the requirements for uniformity of illumination and uniformity of image are far more stringent in printing then in projection display. Specifically, the tolerance to roll-off at the edges of the illumination is much greater. The telecentricity is required to maintain the uniformity of the image at the image plane due to constraints on the LCD operation. Throughout the system conjugate planes 28 are shown in FIG. 1a. The first element in illumination optics 11 is a collimating lens 32 into frame 19. As shown in FIG. 3, each LED 14, 16, 18 is mounted in frame 19 with the anode 22 and a cathode 24 leads behind frame 19 and collimating lens 32 in front. The individual collimating lenses 32 are required only if the encapsulation of the diodes is insufficient. The collimating lenses aid in collecting the light from the rapidly diverging light from LEDs 14, 16, 18. The use of collimating lens 32 is optional and dependent on the particular choice of LEDs.

Illumination optics 11 is designed to illuminate a nearly square or rectangular aperture. In general, axially symmetric components are employed in the illumination. Following collimating lens 32 is a combiner field lens 34 that images light to an integrator assembly 35 which includes two lenslet arrays 40a, 40b. The light at the intermediate illumination plane is broken into a number of portions equivalent to the number of elements in lenslet array 40a. The individual portions are then imaged and magnified by second lenslet array 40b and second field lens 42. Light passing through integrator assembly 35 along with a following field lens 44 is passed through an aperture stop 46 and a relay lens 48. Relay lens 48 is positioned immediately before polarization beamsplitter element 50.

Figure 1B:
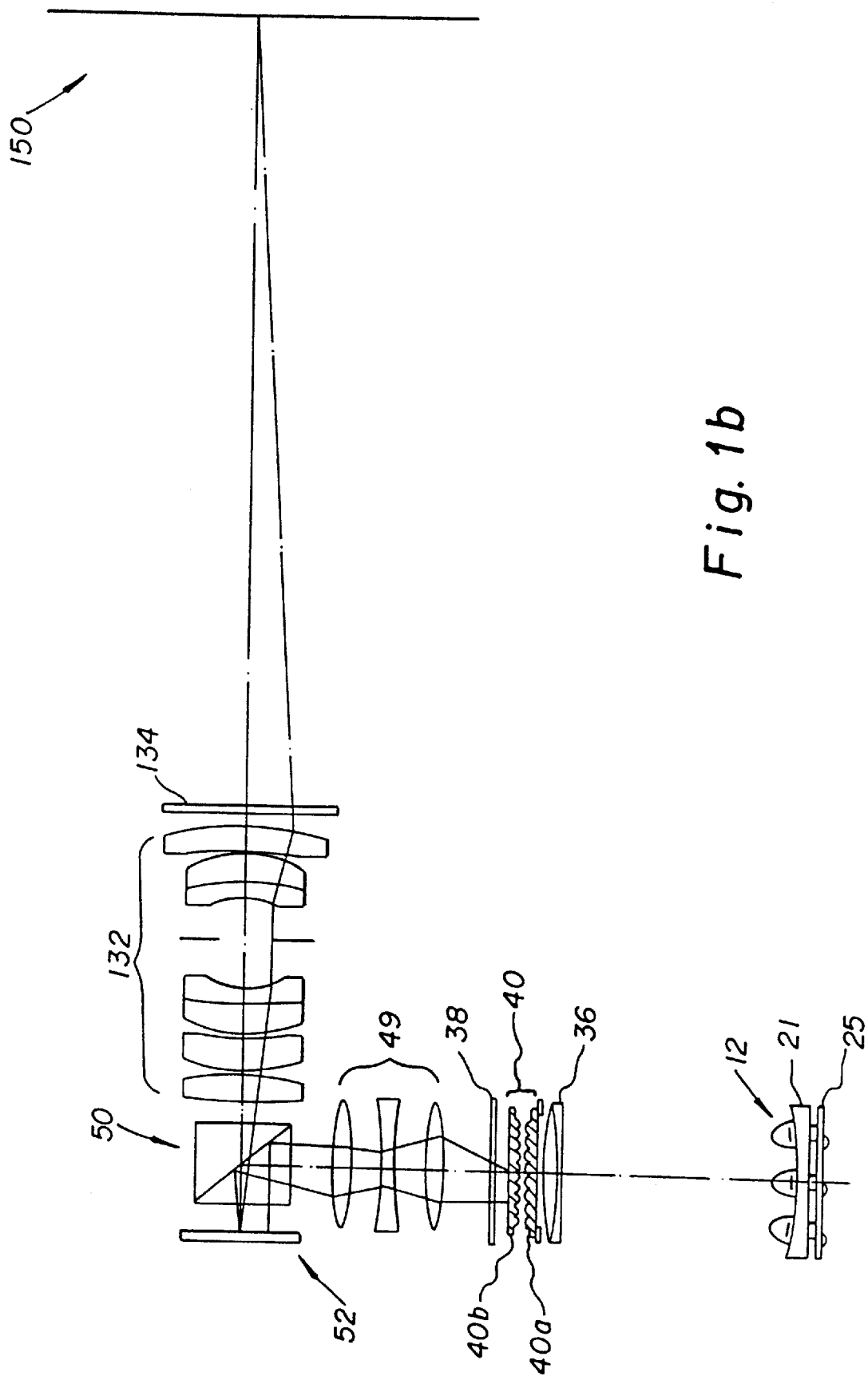
FIG. 1b illustrates a layout of a reflective spatial light modulator based printing system for printing two-dimensional swaths.
Figure 1C:
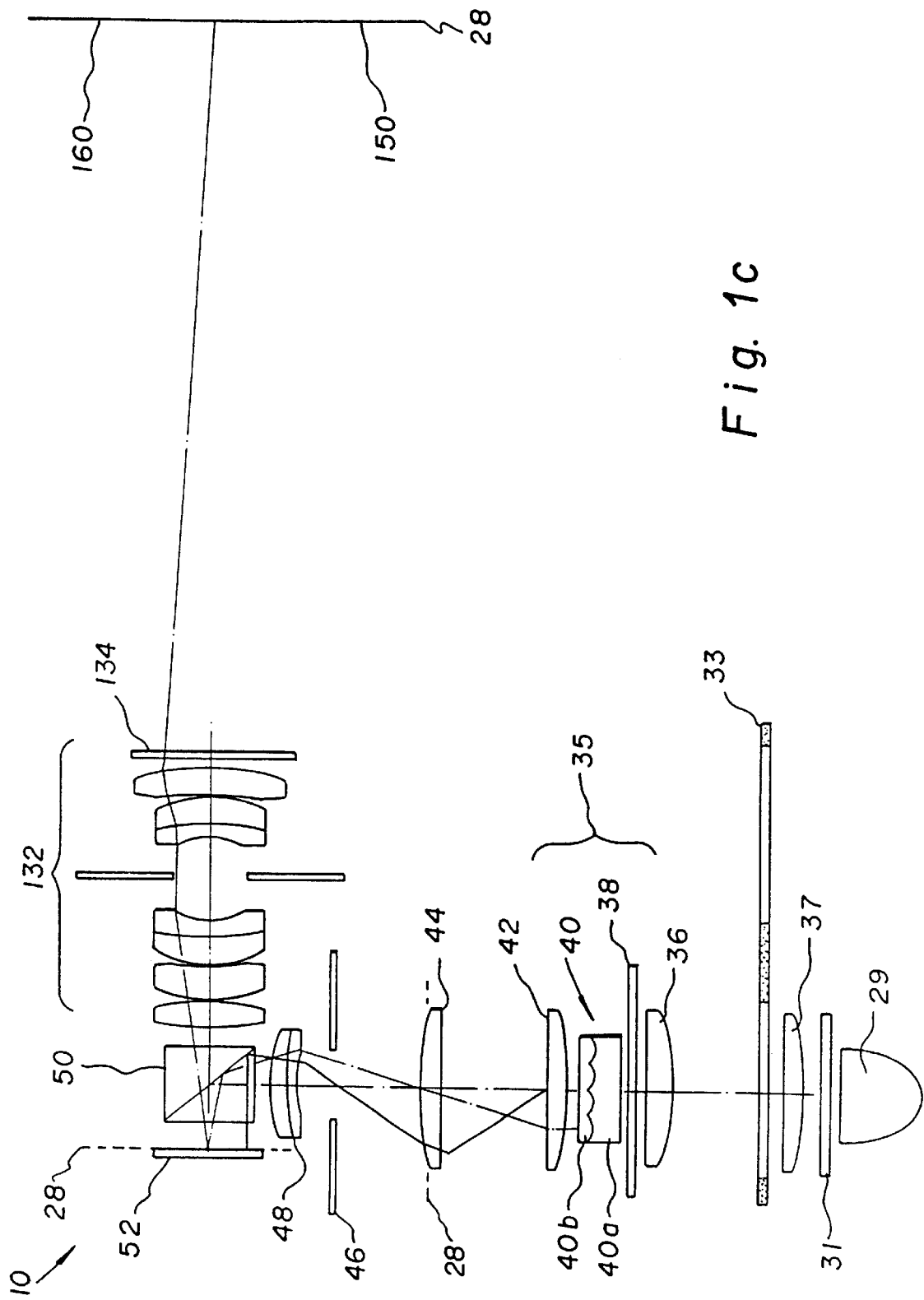
FIG. 1c illustrates a layout of a reflective spatial light modulator based printing system for printing two-dimensional swaths using a halogen lamp.

The LEDs of light source 30, collimating lens 32 and combiner field lens 34 can be replaced by a red, green and blue 2-dimensional array of suitably lensed lamps 12 placed on a spherical surface 21 which is placed on a printed circuit board 25, shown in FIG. 1b. The center of curvature of spherical surface 21 is at least at the center of collimating lens 32 as shown in FIG. 1b. It should also be noted that, although relay lens 48, field lens 44, and field lens 42 are shown as separate elements in FIG. 1a, a single compound lens 49 providing uniform and essentially telecentric illumination could be employed instead of the three individual elements as is depicted in FIG. 1c.

Figure 5:
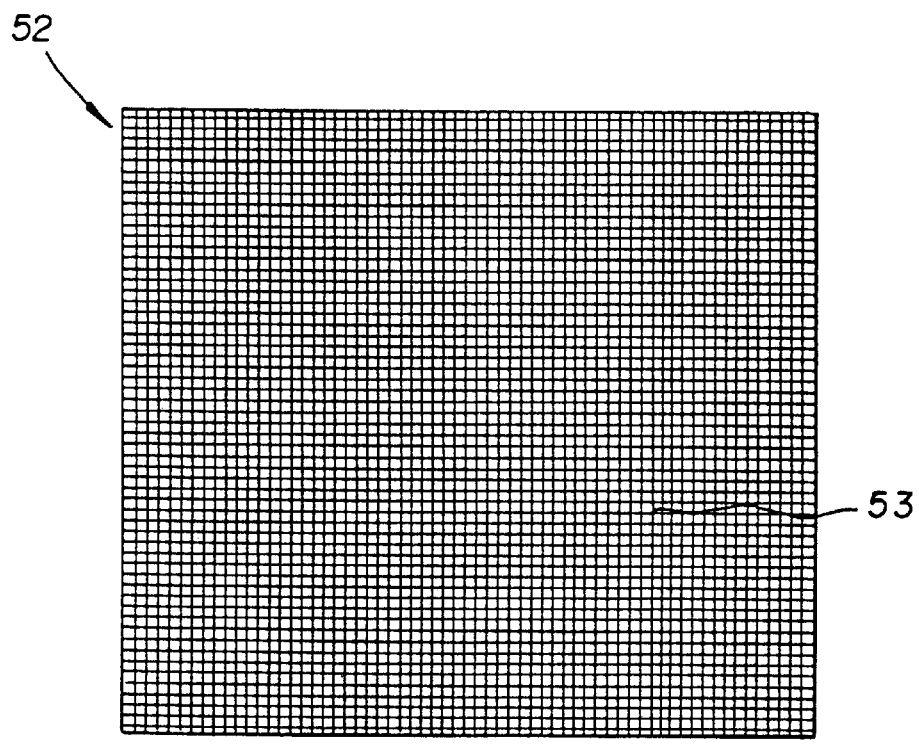
FIG. 5 illustrates a front surface view of multiple site spatial light modulator.

Spatial light modulator 52 of this system is designed for a two dimensional reflective polarization based spatial light modulator as is shown in FIG. 5a. Spatial light modulator 52 includes a plurality of individual modulator sites 53 that are individually modulatable. Light passes through spatial light modulator 52, is reflected off the back of the spatial light modulator 52, and returns through spatial light modulator 52. If a modulator site 53 is "on" bright, during the round-trip through spatial light modulator 52, the polarization state of the light is rotated. In an ideal case the light is rotated 90 degrees. However, this degree of rotation is rarely easily achieved. If a given modulator site is "off" or dark, the light is not rotated. The light that is not rotated is not passed straight through the polarization beamsplitter element 50 but is redirected away from the media plane by polarization beamsplitter element 50.

The most readily available choice of reflective polarization based modulators is the reflective liquid crystal modulator. Such modulators, originally developed for use in projection display, can have resolutions as high as 4000×2000 modulator sites. Currently, resolutions of 1200×1600 sites are available with footprints as small as a 0.9 in diagonal. These high resolution reflective LCDs, are often twisted nematic LCDs, or homeotropically aligned reflective LCDs, although other types of reflective LCDs such as ferroelectric are often employed in projection display. Some of the key characteristics of these LCDs are the high resolution, the high contrast (>100:1) in all three primary colors, the fast frame rate of 70 frames per second or higher, and the high aperture ratio (>90%). In addition, the incorporation of CMOS backplane increases the uniformity across the array. The LCDs are also capable of producing an eight bit gray scale either through pulse width modulation or through analog operation. In either case data may be introduced digitally to the printing system. These characteristics ensure that the reflective LCD is an excellent choice for use in a reflective printing system.

Spatial light modulator 52 can be designed in a number of different configurations. The most amenable to a low cost printing system is a single chip system used in color sequential mode. Such a modulator may be either specifically designed for color sequential use, often incorporating a faster backplane and slightly different liquid crystal compositions, or can be a single chip with a 60 to 70 frame per second backplane. The latter option is sufficient for printing because the high frame rates are not a necessity and often reduce the bit depth of the resulting image. However, while many liquid crystals are the same basic crystal for all three primary color wavelengths, sometimes either due to the specific applied voltage or the liquid crystal thickness, operation may differ in the three wavelengths. Specifically, for a given liquid crystal composition, depth and applied voltage, the resulting polarization rotation on an incident beam may vary with wavelength. The efficiency and contrast of the modulation will vary among the three colors. This optical system is designed to image and pass rotated light. However, the degree of rotation will vary as a function of wavelength. In the bright, or "on" state, this difference in rotation will effect the efficiency of the system. In other words, the percentage of incident light that is actually rotated and imaged on the media plane will vary. This difference in wavelength efficiency can be accounted for by varying the illumination strength, and exposure time. Also, the media requires different power densities in the different wavelengths. The bigger problems arise in the dark or "off state". In this state, the light is not rotated and should not be directed through the cube and imaged. If the light is in fact, rotated, light will leak through the imaging system and decrease the contrast.

One of the aspects which governs this printing system and is applicable to all embodiments is the means used to achieve sufficient uniformity while retaining the gray scale. Spatial light modulator 52 alone can receive up to 8 bits of bit depth. However, 8 bits to the modulator may not translate to adequate resolution at the media. To print an adequate gray scale, additional bit depth must be provided. Furthermore, LCD modulators are know to have some measure of roll-off or loss of contrast at the edges of the device. To address both these issues, the print system takes advantage of the fact that modulators designed for projection display generally refresh data faster then is required for printing. Consequently, it is possible to create a single image at the media as a super-position of a series of images. The individual images that comprise the final image vary both in information content and illumination.

First, every image is broken into the three basic color components. Information corresponding to the red content of the image is displayed on the modulator. Within each color, multiple frames of image data are displayed on the modulator. Once an acceptable frame is displayed on the modulator, the first illumination pulse is employed. Following the recording of the initial frame of data, a subsequent frame is displayed on the modulator. The illumination level of the subsequent frame is altered according to the density requirements at the media. Similarly, as many frames as may be needed are introduced at the modulator and imaged at the media with the illumination adjusted accordingly. It is possible to maintain the same image data at the modulator and by altering the illumination level alone, introduce additional bit depth. By varying the illumination level, (and/or duration), and by altering the information content, the system can build a composite image out of a series of preliminary images. The superposition of the images in a given color of varied information content and varied illumination level introduces additional bit depth to the composite image. Once a given color is printed the same procedure is repeated with the data and illumination corresponding to the next color.

In many cases, the first frame of new data may display some history or residual information from the preceding data. If this is the case, that frame of data is not illuminated immediately, rather, it is refreshed and then illuminated.

Because of the digital addressability of the LCD device and the pulsed LED illumination method of illumination, this approach to printing provides an adequate bit depth and reasonable timing for use in a photographic printer.

It is the intention of this invention to present an algorithm by which aforementioned multiple exposure algorithm can be utilized to increase the bit depth at the media plane. It should be noted that while the algorithm was designed for incorporation with a reflective LCD based printing engine, the method is transparent to the specific modulator type. This algorithm may in fact be implemented in printing systems utilizing a different exposure engine.

Density Model

The model that describes the final print density as a function of relative logE is given as follows[1]:

$$\text{density} = a + \frac{b-a}{1+e^{-c(c-x_0)}}$$

where:
x=relative log exposure, 0<x<1.5
density=status A density X100
a, b, c, and $x_0$ are given as follows

| parameter | Cyan | Magenta | Yellow |
|---|---|---|---|
| a | 8.14 | 7.89 | −0.14 |
| b | 265.9 | 269.1 | 231.5 |
| c | 6.36 | 5.42 | 4.86 |
| $x_0$ | 0.718 | 0.868 | 0.627 |

Figure 6:
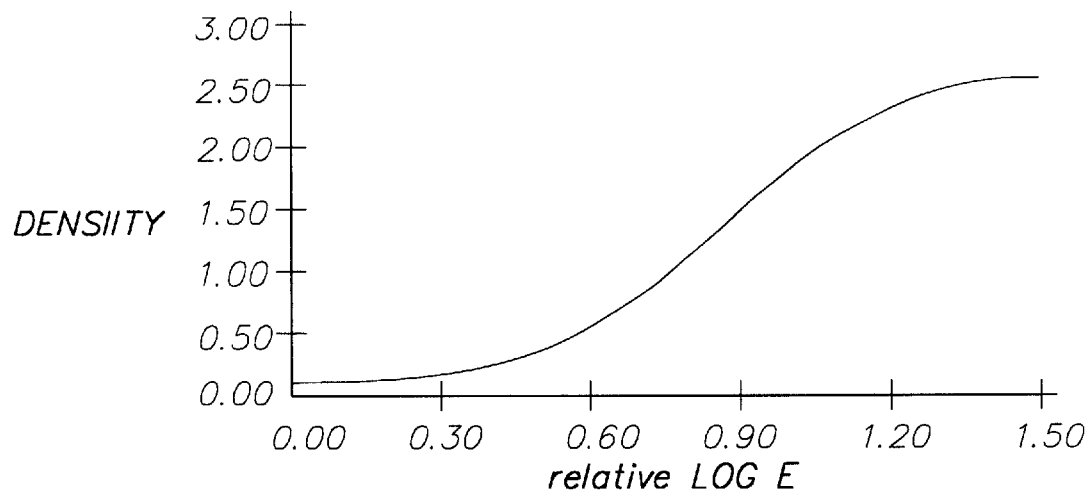
FIG. 6 is a graph of density versus relative logE for a magenta film layer.

For reference, FIG. 6 shows a graph of density vs. LogE using the above formula, and with the parameters of the magenta (green light sensitive) layer.

Figure 7:
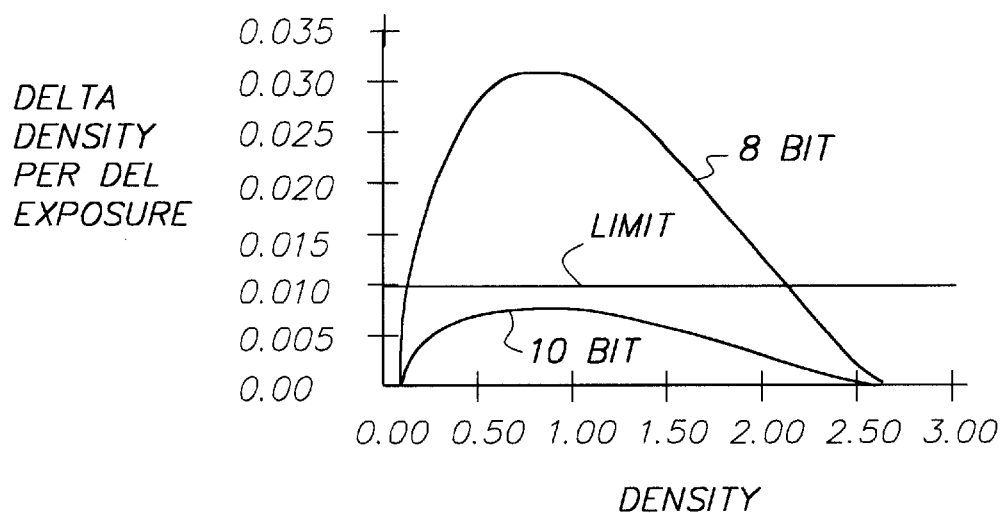
FIG. 7 is a graph of change in density versus density for 8 and 10 bit linear exposure engines.

The requirement for the LCD printer calls for a change in density of no more than 0.01 between any two adjacent digital input codes, over the relative log exposure range of range 0 to 1.5. Assuming an 8 bit linear exposing system, exposure would be quantized in uniform changes of approximately 0.4%, that is 1 part in 256 per digital input code change. By using the previously described model for film density, this would yield a change in density versus density curve as shown in FIG. 7. Also shown in FIG. 7 is the change in density assuming a 10 bit linear exposing system providing changes in exposure of approximately 0.1%, that is 1 part in 1024. From FIG. 7, it can be seen that an 8 bit linear system is clearly inadequate, whereas a 10 bit linear system is acceptable.

One possible method to compensate for this lack of bit depth would be to expose each print in each color multiple times. For each of the separate RGB density images, the pixels would be assigned to one or more of multiple images. If, for example, four exposures were made for each color, then 12 separate 8 bit images would be generated from the original three color image. This would provide 1021 exposure levels. The assignments to these multiple images would be based upon the exposure required for each particular R, G, B pixel of the original image.

Figure 8:
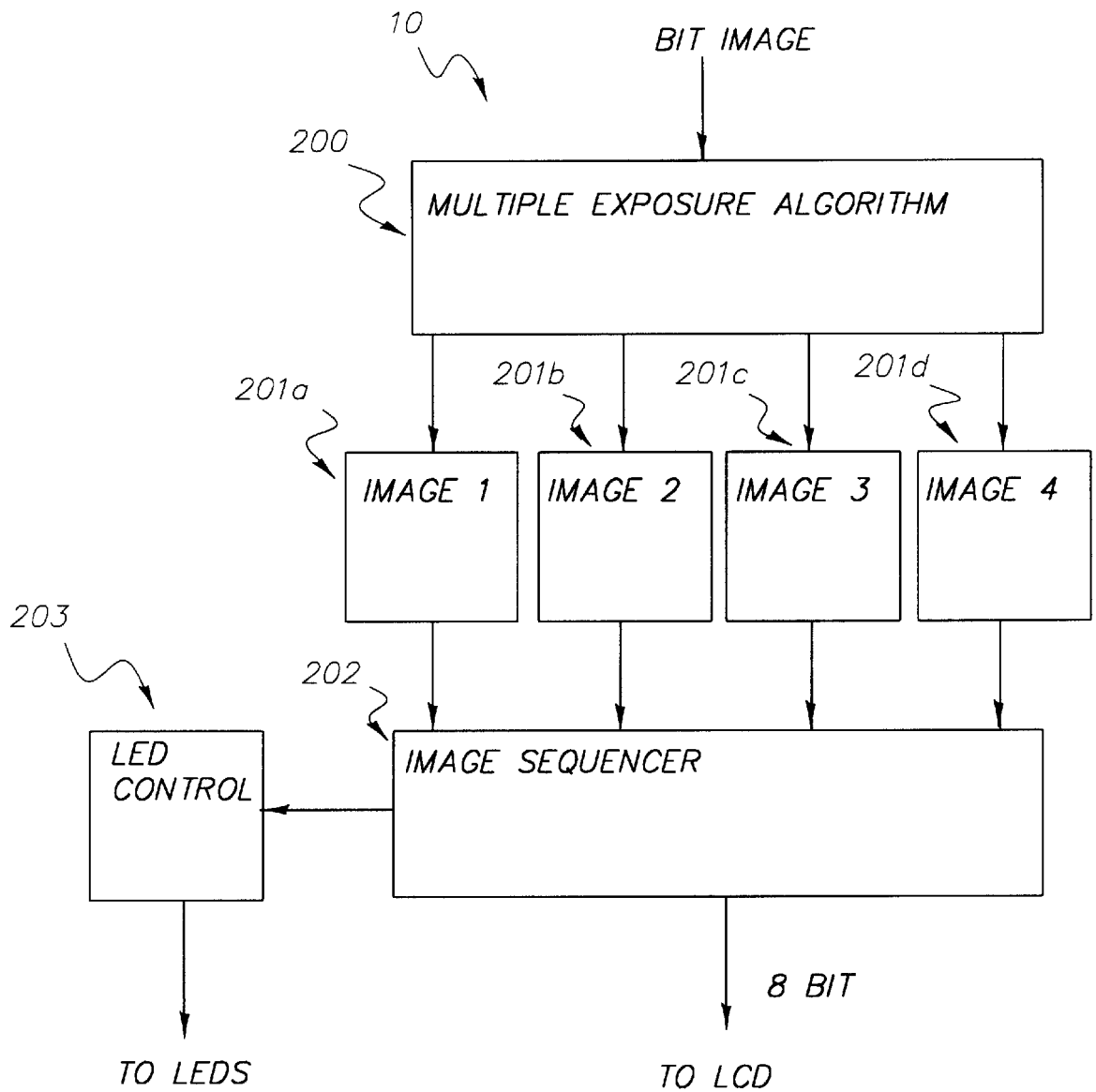
FIG. 8 illustrates the functional block diagram of a system that can provide multiple exposure to improve gray scale resolution.

A block diagram of this multiple exposure concept using showing the parsing of the original image into multiple images is shown in FIG. 8. The 8 bit per color image is passed to the Multiple Exposure Algorithm 200 where it is analyzed for content and then parsed and buffered into multiple images to be sequentially exposed. The buffered images 201 contain the actual pixel data for the LCD along with the illumination power and duration required for the individual images. These images are then accessed, time sequentially, by the Image Sequencer 202, which is responsible for properly timing the writing of the individual buffered images to the LCD, as well as setting the LED control section 203 power level and pulse timing to achieve the required exposure.

The following table illustrates a mapping from a 1021 level input exposure code, into 4 sequential 256 level exposures. The left hand column shows the required exposure in units of the 1021 level digital code. The columns on the right show how this pixel is mapped into a 256 level code for each of the 4 exposures. Note that the sum of the codes in the 4 right hand columns equals the 1021 level input code. Also, for each of the four 4 exposures, the same exposure time and illumination power is used. Note that this is repeated for each of the R, G, B images.

Using the same exposure time and illumination power, as mentioned here, is only for illustration. In practice, various combinations of exposure time and illumination power can be used to achieve the best gray scale for the particular LCD being used and the media being exposed.

TABLE 1

| Input Code (1021 levels) | Exposure 1 Code (256 levels) | Exposure 2 Code (256 levels) | Exposure 3 Code (256 levels) | Exposure 4 Code (256 levels) |
|---|---|---|---|---|
| 0 | 0 | 0 | 0 | 0 |
| 1 | 1 | 1 | 0 | 0 |
| 2 | 1 | 1 | 0 | 0 |
| 3 | 1 | 1 | 1 | 0 |
| 4 | 1 | 1 | 1 | 1 |
| 5 | 2 | 1 | 1 | 1 |
| 6 | 2 | 2 | 1 | 1 |
| 7 | 2 | 2 | 2 | 1 |
| 8 | 2 | 2 | 2 | 2 |
| 9 | 3 | 2 | 2 | 2 |
| ... | ... | ... | ... | ... |
| 1015 | 254 | 254 | 254 | 253 |
| 1016 | 254 | 254 | 254 | 254 |
| 1017 | 255 | 254 | 254 | 254 |
| 1018 | 255 | 255 | 254 | 254 |
| 1019 | 255 | 255 | 255 | 254 |
| 1020 | 255 | 255 | 255 | 255 |

This can be implemented in either software or by using hardware. The algorithm used to generate each of the 4 exposures is as follows:

Exposure 1 Code=Roundup(Input Code/4)
Exposure 2 Code=Roundup((Input Code−Exposure 1 Code)/ 3)
Exposure 3 Code=Roundup((Input Code−Exposure 1 Code− Exposure 2 Code)/2)

Exposure 4 Code=Roundup(Input Code-Exposure 1 Code-Exposure 2 Code-Exposure 3 Code)

This algorithm can be implemented either using software within the computer supplying printer data, or hardware within the printer. The hardware solution would allow the computer supplying the printer data to have a generic view of the printer and 'see' and equivalent 10 bit print engine. In this manner, different print engines could be made to look the same. For example, if a true 10 bit print engine were developed, the computer supplying the printer data, would not require any modification to its hardware or software. In addition, a hardware solution would unburden the computer from having to perform this additional task. On the other hand, the hardware solution would be more costly to develop and manufacture.

Figure 9:
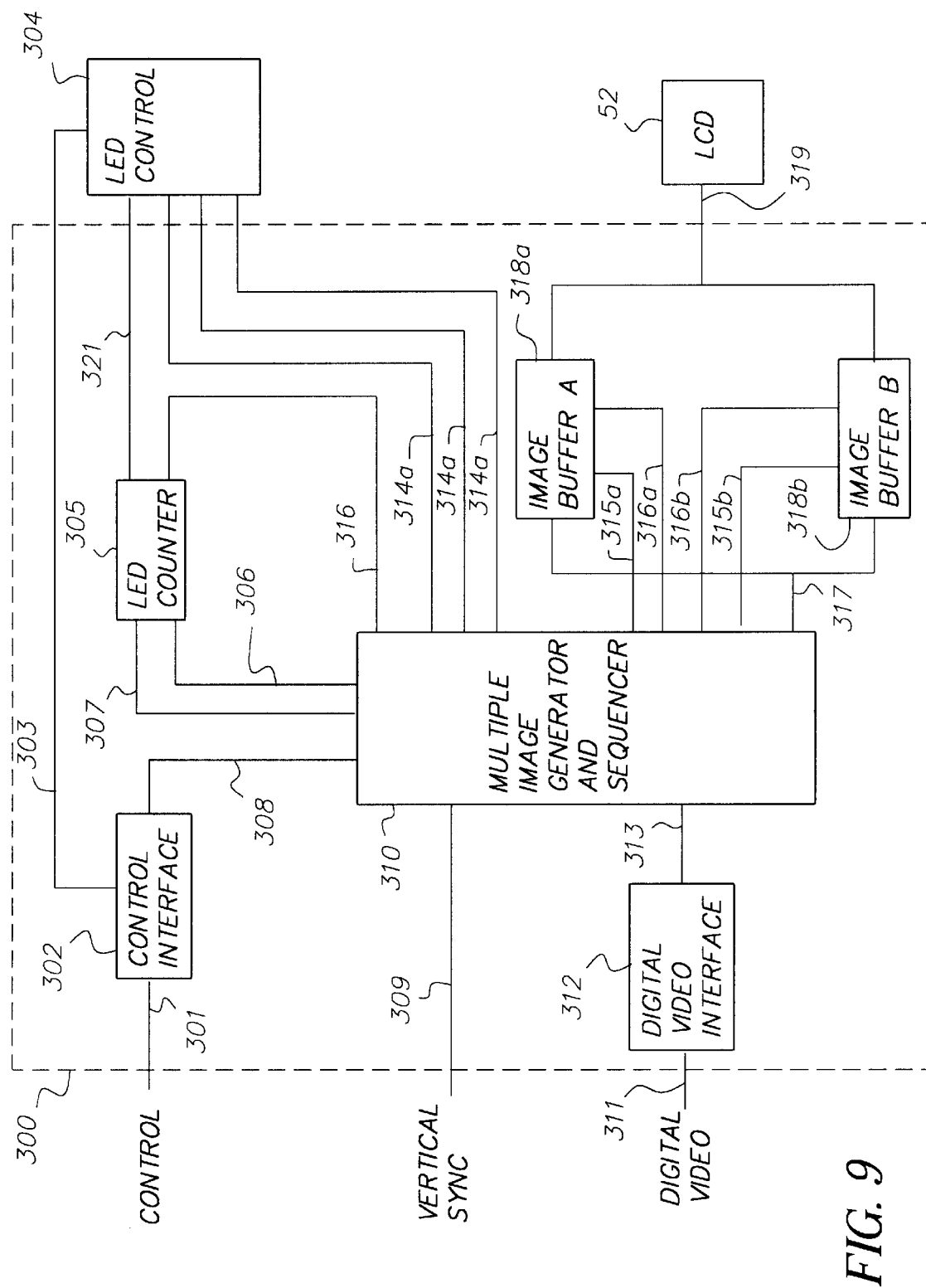
FIG. 9 illustrates a hardware implementation of a multiple exposure system.

A hardware implementation is illustrated in FIG. 9, referred in general as numeral 300. A standard digital video interface is shown, which is typical of contemporary computer workstations. The digital video signals 311 are received by the digital video interface 312 which produces an 8 bit per pixel per color digital signal 313 that is routed to the multiple image generator and sequencer 310. The vertical sync signal 309 is used by the multiple image generator and sequencer for timing control. A control interface shown as 301 and 302 is employed to provide command signals 308 to allow the image generator to begin processing and sequencing. In addition, the control interface also allows the computer workstation to set a user defined illumination level to the LED control 304 via control signal 303. A typical industry standard control interface is Integrated Circuit Interface (IIC).

Once the multiple image generator and sequencer 310 receives one of the three color images to print, and has received the required command signal 308, the first of the multiple images will be generated and sent to image buffer A 318a, via signals 317 and 315a. Also, the required exposure time will be loaded to the LED counter 305 by way of control signal 306 at which point the output signal 321 will enable the LED control. When exposure begins, the multiple image generator and sequencer will begin generation of the next of the multiple images and store in image buffer B 318b via signal line 317 and 315b. The image in image buffer A is allowed to move the spatial light modulator 52 over the interface 319 by enabling the buffer A output with signal 316a. Once the image has settled at the LCD, the illumination for the appropriate color is enabled by way of signals 314a, 314b, or 314c. At this time, the LED counter will begin counting pulses from signal line 307, which is derived from the vertical sync signal 309. When a number of pulses has been counted that equals that which was pre-loaded, the output signal of the LED counter 305 will cause the LED control to once again be disabled. The LED color enable signal, 314a, 314b, or 314c is disabled, the appropriate count for the next exposure is loaded into the LED counter, image buffer B is sent to the LCD, and the next image is loaded to image buffer A. Once the appropriate settling time has expired, exposure of the next image will occur. This sequence is repeated for all of the multiple images for each of the three colors.

FIG. 9 shows the LED counter 305 as a separate component, however, in practice its function could be incorporated as part of the multiple image generator and sequencer 310. Also, two image buffers are shown as 318a and 318b. For some applications, it may be advantageous to buffer all of the multiple image ahead-of-time as would be the case where real-time generation of the multiple images causes excessive time delay. Conversely, a single or no image buffer may be possible to reduce system cost.

Figure 10:
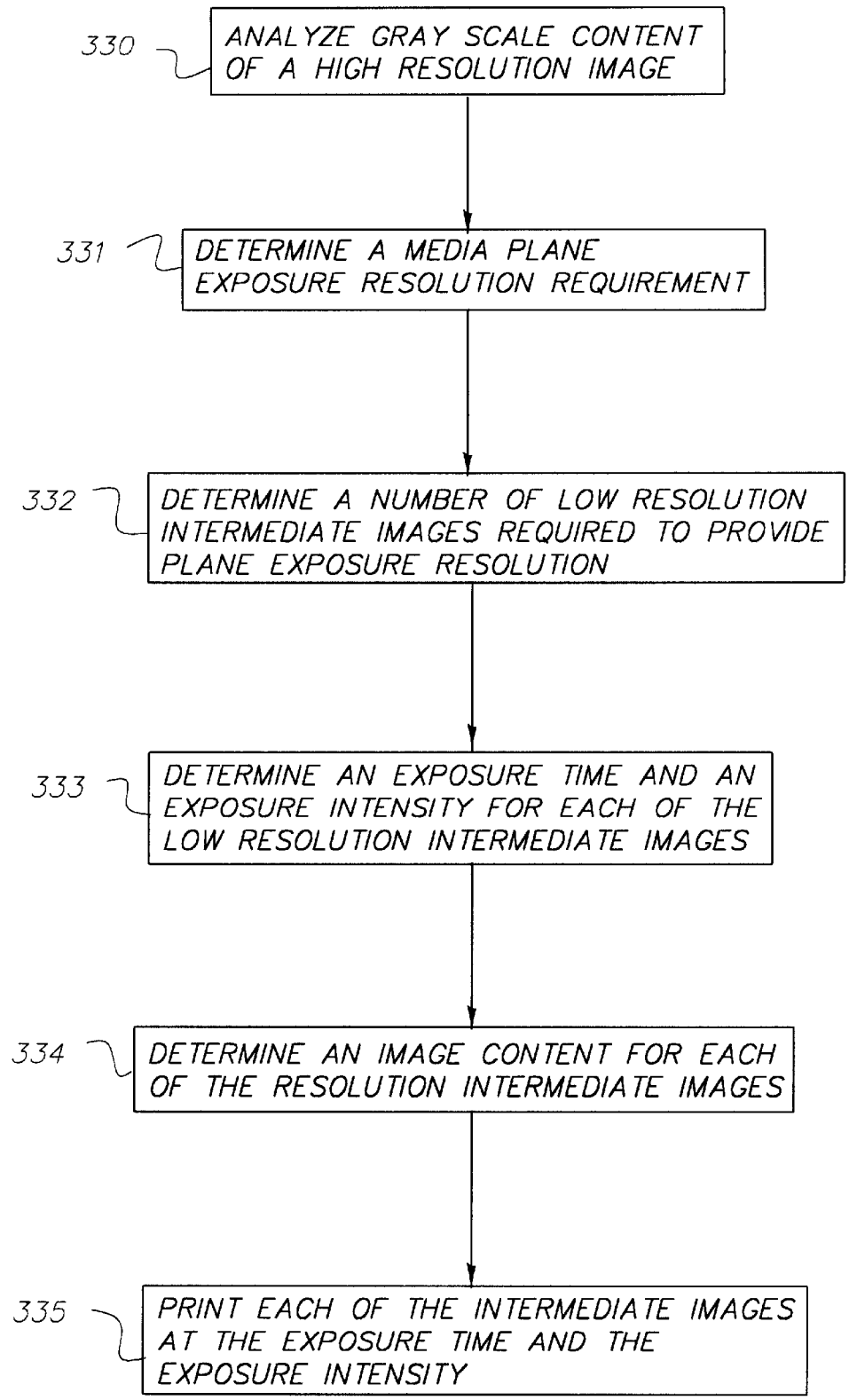
FIG. 10 is a flow chart of the present invention.

Referring now to FIG. 10 a gray scale content 330 of a high resolution image is analyzed and a determination is made of a media plane 331 exposure resolution requirement. Exposure time and an exposure intensity is determined for each of the low resolution intermediate images. A number of low resolution intermediate images 332 are required to provide the media plane exposure resolution; and an exposure time and exposure intensity 333 for each of the low resolution intermediate images is determined. An image content for each of the low resolution intermediate images is determined 334 and each of the low resolution intermediate images is printed 335 at the exposure time and the exposure intensity.

The invention has been described in detail with particular reference to certain preferred embodiments thereof, but it will be understood that variations and modifications can be effected within the scope of the invention.

Parts List

10. Photographic printer
11. Illumination optics
12. Lamps
14. Red light emitting diodes
16. Green light emitting diodes
18. Blue light emitting diodes
19. Frame
20. Circular aperture
21. Spherical surface
22. Anode
24. Cathode
25. Printed circuit board
28. Conjugate planes
30. Light source
32. Collimating lens
34. Combiner field lens
35. Integrater assembly
40. Lenslet array assembly
40a. Lenslet array
40b. Lenslet array
42. Field lens
44. Field lens
46. Aperture stop
48. Relay lens
49. Compound lens
50. Polarization beamsplitter element
52. Spatial light modulator
53. Individual modulator site
132. Print lens assembly
150. Image plane
160. Light sensitive media
200. Multiple Exposure Algorithm
201a. Buffered image
201b. Buffered image
201c. Buffered image
201d. Buffered image
202. Image Sequencer
203. LED control section
300. Hardware implementation
303. Control signal
304. LED control
305. LED counter
306. Control signal
307. Signal line
308. Command signal
309. Vertical sync signal
310. Multiple image generator and sequencer
311. Digital video signals 312. Digital video interface
313. Color digital signal
314a. Signal
314b. Signal
314c. Signal
315a. Signal
315b. Signal
316a. Signal
317. Signal
318a. Image buffer A
318b. Image buffer B
319. Interface
321. Output signal
330. Analyze gray scale content
331. Determine media plane
332. Determine number of low resolution intermediate images
333. Determine exposure time and exposure intensity
334. Determine image content
335. Print each intermediate images

What is claimed is:

1. A method for increasing gray scale exposure resolution comprising the steps of:

analyzing gray scale content of a high resolution image;

determining a media plane exposure resolution requirement;

determining a number of low gray scale resolution intermediate images for each color in said high gray scale resolution image required to provide said media plane exposure resolution;

determining an exposure time and an exposure intensity for each of said low resolution intermediate images;

determining an image content for each of said low resolution intermediate images; and printing each of said intermediate images at said exposure time and said exposure intensity.

2. A method for improving exposure resolution as in claim 1 wherein each of said low resolution intermediate images has a different image content.

3. A method for improving exposure resolution as in claim 1 wherein each of said low resolution intermediate images is printed at a separate exposure time and exposure intensity.

4. A method of printing two-dimensional swaths of area onto a photosensitive media using at least one reflective liquid crystal spatial light modulator comprising the steps of:

imaging light from a light source through an optics assembly;

passing said light from said optics assembly through a polarization beamsplitter element to isolate a first polarization state of said light;

directing said first polarized light to said spatial light modulator to create an essentially telecentric illumination at the spatial light modulator;

analyzing gray scale content of a high gray scale resolution image;

determining a media plane exposure resolution requirement;

determining a number of low gray scale resolution intermediate images for each color in said high resolution image required to provide said media plane exposure resolution;

determining an exposure time and an exposure intensity for each of said low resolution intermediate images;

determining an image content for each of said intermediate images;

providing said image content for each of said low resolution images to said spatial light modulator in a sequential manner;

reflecting and changing said first polarization state to a second polarized state;

wherein said light having said second polarized state passes through said polarization beamsplitter, and imaging said light having said second polarized state through a print lens assembly onto said photosensitive media for each of said low resolution intermediate images.

* * * * *